(12) United States Patent
Muraki et al.

(10) Patent No.: US 7,212,198 B2
(45) Date of Patent: May 1, 2007

(54) SIMULATION SYSTEM HAVING IMAGE GENERATING FUNCTION AND SIMULATION METHOD HAVING IMAGE GENERATING PROCESS

(75) Inventors: Shigeru Muraki, c/o National Institute of Advanced Industrial Science and Technology, AIST Tsukuba Central 2, 1-1-1, Umezono, Tsukuba-shi, Ibaraki (JP) 305-8568; Masato Ogata, Kamakura (JP); Kagenori Kajihara, Kamakura (JP); Xuezhen Liu, Kamakura (JP); Kenji Koshizuka, Kamakura (JP)

(73) Assignees: National Institute of Advanced Industrial Science and Technology, Tokyo (JP); Shigeru Muraki, Ibaraki (JP); Mitsubishi Precision Co., Ltd., Tokyo (JP)

( * ) Notice: Subject to any disclaimer, the term of this patent is extended or adjusted under 35 U.S.C. 154(b) by 287 days.

(21) Appl. No.: 10/258,457

(22) PCT Filed: Feb. 27, 2002

(86) PCT No.: PCT/JP02/01816

§ 371 (c)(1),
(2), (4) Date: Oct. 23, 2002

(87) PCT Pub. No.: WO02/069271

PCT Pub. Date: Sep. 6, 2002

(65) Prior Publication Data
US 2003/0117394 A1 Jun. 26, 2003

(30) Foreign Application Priority Data
Feb. 28, 2001 (JP) .............................. 2001-055354

(51) Int. Cl.
*G06T 15/00* (2006.01)
(52) U.S. Cl. ....................... 345/419; 345/619; 345/629
(58) Field of Classification Search ................ 345/418, 345/419, 421, 427, 428, 619, 629
See application file for complete search history.

(56) References Cited

U.S. PATENT DOCUMENTS 5,689,722 A * 11/1997 Swarztrauber ............... 712/12

(Continued)

FOREIGN PATENT DOCUMENTS

| JP | 02-096281 | 4/1990 |
| JP | 11-144078 | 5/1999 |

OTHER PUBLICATIONS

Shimokawa et al. "A study on space-time visual simulation of nerve excitement propagation". *The Institute of Electronics, Information and Communication Engineers*, vol. 99, No. 383, pp. 31-35 (Oct. 22, 1999) and English abstract.

(Continued)

*Primary Examiner*—Phu K. Nguyen
(74) *Attorney, Agent, or Firm*—Merchant & Gould P.C.

(57) ABSTRACT

The invention provides a simulation system and method having an image generating function that can visualize the behavior of an object of analysis in real time. The behavior of the object of analysis is divided into a plurality of subspaces, and is visualized as subspace images by an MP method by performing simulation computations for the respective subspaces at nodes 431 to 438. The subspace images are sent to a pipelined composer 44 where the images are blended together by considering occlusion relationships determined by reference to a viewpoint by a BSP method. The resulting composited image is corrected for distortion at a server 40 by using a texture mapping function, and is displayed on a display apparatus 41.

38 Claims, 18 Drawing Sheets

U.S. PATENT DOCUMENTS

| | | | | |
|---|---|---|---|---|
| 5,797,035 | A | * | 8/1998 | Birrittella et al. ............. 710/35 |
| 5,892,962 | A | * | 4/1999 | Cloutier ....................... 712/16 |
| 5,896,501 | A | * | 4/1999 | Ikeda et al. ................. 709/216 |
| 6,028,608 | A | * | 2/2000 | Jenkins ....................... 345/619 |
| 6,029,136 | A | * | 2/2000 | Tsutsui ....................... 704/500 |
| 6,473,087 | B1 | * | 10/2002 | Tsang ......................... 345/505 |
| RE38,410 | E | * | 1/2004 | Hersch et al. ............. 709/203 |
| 6,961,841 | B2 | * | 11/2005 | Huppenthal et al. .......... 712/34 |

OTHER PUBLICATIONS

Muraki et al. Shineki System no Diakibo Simulation o Mazashite, *Bit*, vol. 33, No. 3, pp. 58-60 (Feb. 13, 2001).

Ma et al. "A data distributed, parallel algorithm for ray-traced volume rendering". In: Proceedings of the 1993 symposium on Parallel rendering, New York: ACM Press, pp. 15-22 (1993).

Ray et al. "The race II engine for real-time volume rendering". In: Proceeding 2000 SIGGLAPH/EUROGRAPHICS workshop on Graphics hardware, New York: ACM Press, pp. 129-135 (2000).

Ogata et al. "A parallel volume-rendering system using multiple-shear composition". *The Journal of the Institute of Image Information and Television Engineers,* vol. 55, No. 7, pp. 1011-1018 (Jul. 20, 2001) and English abstract.

Muraki et al. "VG-cluster: A scalable visual computing system". Visual Computing Graphics to CAD Godo Symposium 2001 yokoshu, The Institute of Image Electronics Engineers of Japan, pp. 85-90 (Jun. 12, 2001).

Muraki et al. "VG cluster: Large scale visual computing system for volumetric simulations", on-line (Oct. 1, 2000).

* cited by examiner

Fig.6
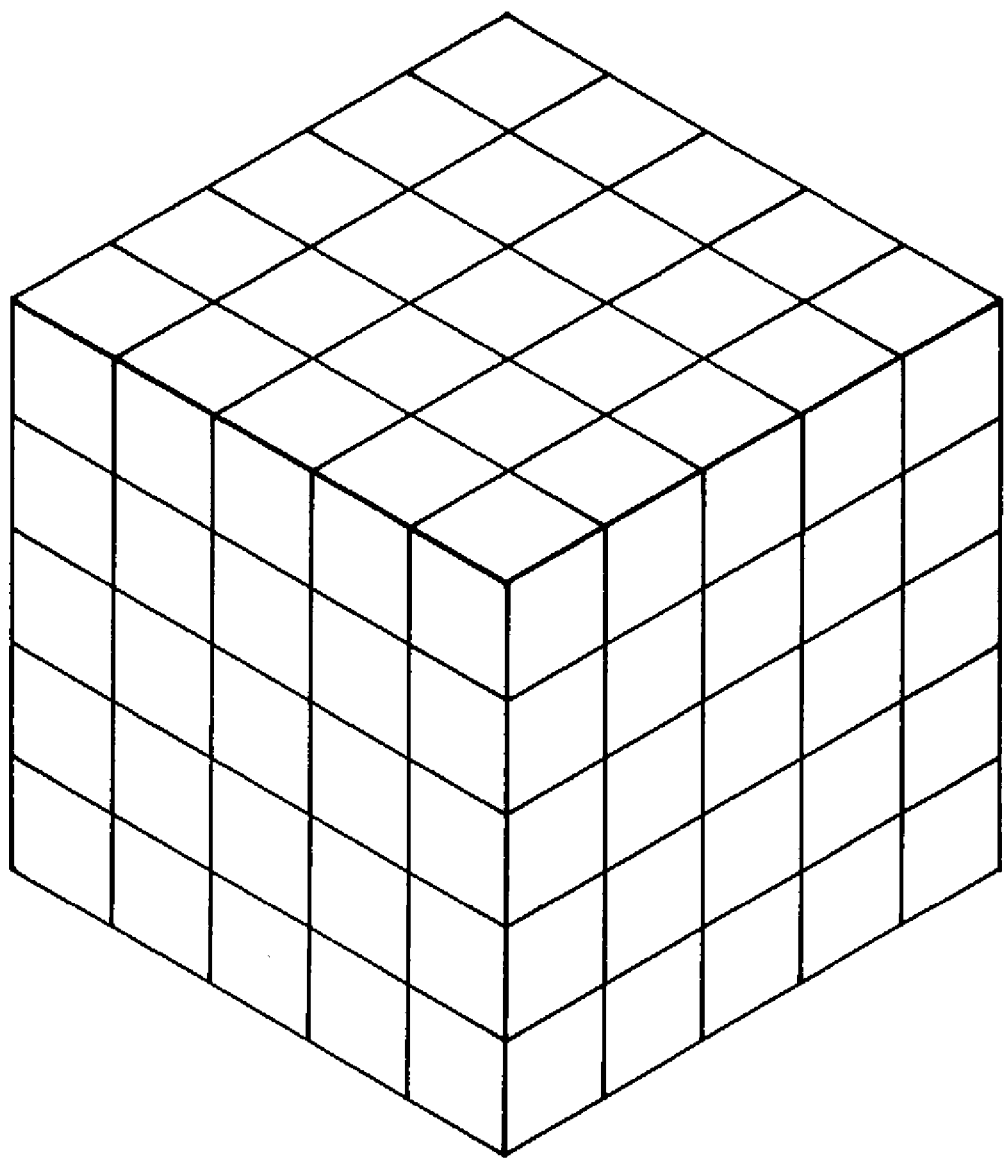
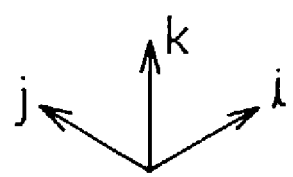

Fig.8
(A)
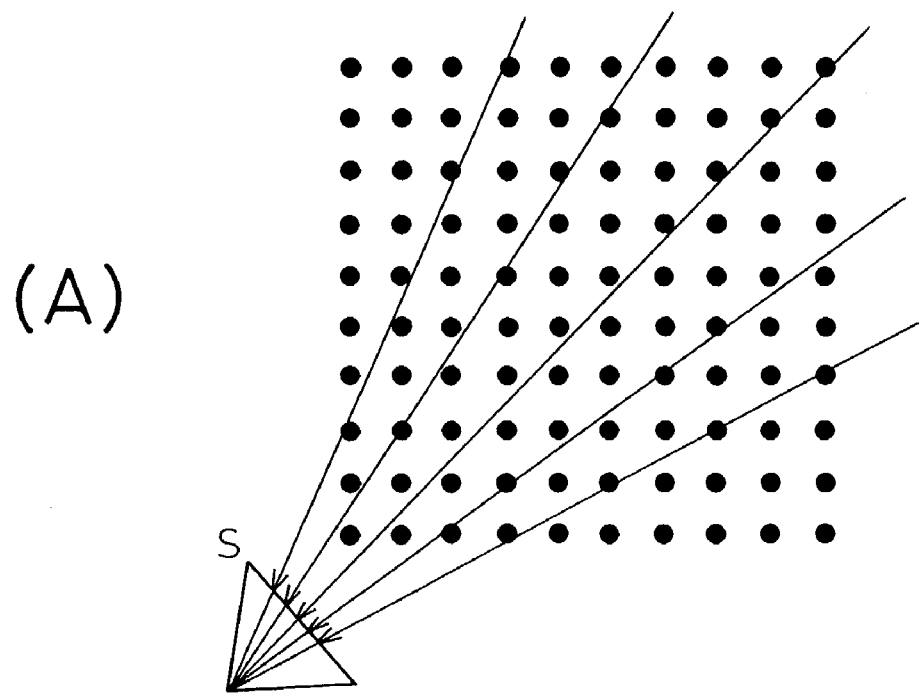
(B)
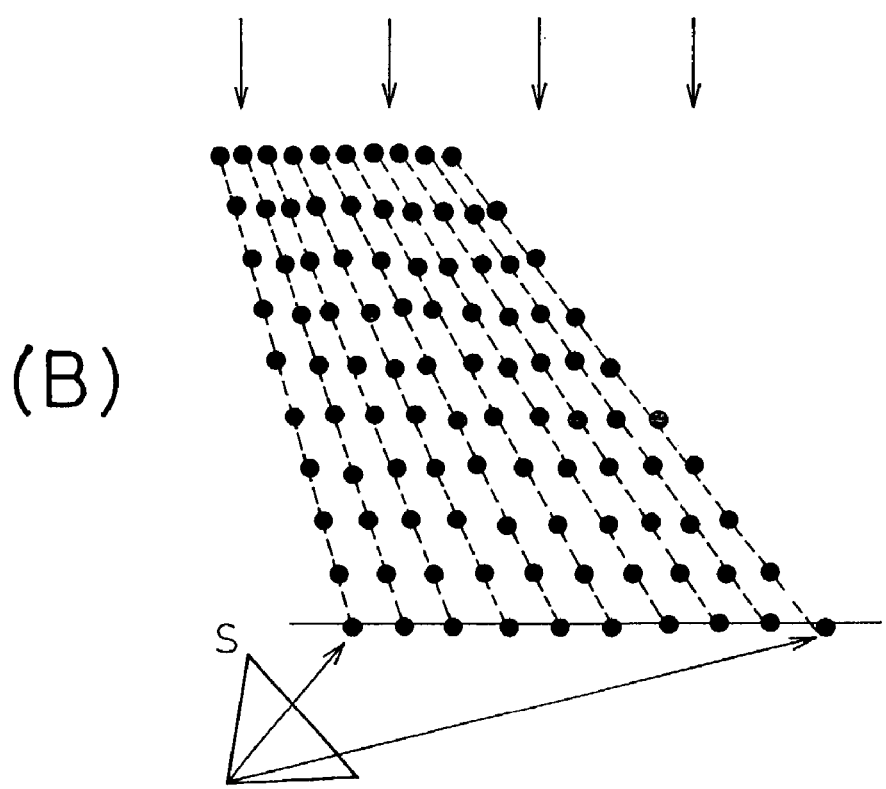

PO: PARAMETER OUTPUT
PI: PARAMETER INPUT
S: SIMULATION
R: SUBSPACE IMAGE GENERATION

IO: SUBSPACE IMAGE OUTPUT
II: SUBSPACE IMAGE INPUT
D: IMAGE DISPLAY

SIMULATION SYSTEM HAVING IMAGE GENERATING FUNCTION AND SIMULATION METHOD HAVING IMAGE GENERATING PROCESS

1. TECHNICAL FIELD

The present invention relates to a simulation system and method and, more particularly, to a simulation system having an image generating function, and a simulation method having an image generating process, that can visualize the behavior of an analytical model in real time by simulating the behavior of the object of analysis by dividing a three-dimensional space, in which the object of analysis is constructed, into a plurality of subspaces, and by visualizing the result of the simulation on a subspace-by-subspace basis and thereafter superposing the resulting subspace images one on top of another by considering the occlusion relationship between them.

2. BACKGROUND ART

With recent improvements in the performance of digital computers, it has become possible to simulate the behavior of a large-scale object of analysis. For an easy understanding of the behavior, it is important that the result of the simulation be presented in visible form.

FIG. 1 is a diagram showing the configuration of a prior art simulation system, which comprises a simulator 10 for computing the dynamic characteristics of an object of analysis based on prescribed parameters 1 to m, a storage medium (for example, a hard disk) 11 for storing the results of the computations performed by the simulator 10, a visualization apparatus 12 for visualizing the computation results stored on the storage medium 11, and a display panel 13 for displaying the simulation results visualized by the visualizing device 12.

However, in the prior art simulation system, as the visualization is implemented as a post-process to be carried out after the simulation, the following problems arise.

1. It is difficult to observe the results in real time, upon changing the parameters, because the simulation results output from the simulator are visualized after once storing them on the storage medium.

2. For the visualization apparatus to visualize the simulation results, the simulation results stored on the hard disk or the like must be converted to a format that matches the visualization apparatus, but if the scale of the object of analysis is large, an enormous amount of computation is required for the conversion.

For example, when the viewpoint is moved, an image corresponding to the new viewpoint must be generated anew; on the other hand, when the simulation results are output as volume data for visualization with polygons, the volume data must be converted to polygons. As a result, it has not been possible to present the simulation results as images for observation in real time.

In view of this, a so-called distributed simulation system has been proposed in order to enhance simulation and visualization processing speeds.

FIG. 2 is a diagram showing the configuration of a distributed simulation system having eight nodes; in this system, the behavior of the object of analysis is computed by distributing the processing among the nodes #1 to #8, and the results of the computations are combined.

Outputs of the nodes #1 to #8 are transmitted via a communication line (for example, Message Passing Interface) and a high-speed network switcher 21 to a server 22 for display as an image on a CRT 23.

Here, to present the result of the simulation in a visually recognizable manner, the image must be updated at a rate of about 30 frames per second (video rate), which means that, as the object of analysis becomes complex, the number of nodes, that is, the number of parallel-connected computers, must be increased.

However, since there is only one communication line between the server and the nodes, if the number of nodes is increased, collisions may occur during inter-node or node-server communications, and the overhead time required for communications may become so large that it cannot be ignored.

FIG. 3 is a graph showing the relationship between the number of parallel-connected computers and the processing time, plotting the number of parallel-connected computers along the abscissa and the processing time (in seconds) along the ordinate. As shown in FIG. 3, when the number of parallel-connected computers is increased to between 50 and 100, the processing time does decrease, but on the contrary, when the number of computers is increased beyond 100, the processing time increases. When currently available CPUs are used, the processing time that can be achieved is about 0.5 second at the shortest.

The present invention has been devised in view of the above problem, and it is an object of the invention to provide a simulation system having an image generating function that can visualize the behavior of an object of analysis in real time by simulating the behavior of the object of analysis by dividing a three-dimensional space, in which an object of analysis is constructed, into a plurality of subspaces and by visualizing the result of the simulation on a subspace-by-subspace basis and thereafter blending the resulting subspace images together by considering the occlusion relationship between them.

3. DISCLOSURE OF THE INVENTION

A simulation system and method having a first image generating function comprises: a plurality of subspace simulation means for simulating the behavior of an object of analysis in every prescribed time interval for respective ones of a plurality of subspaces created by dividing a three-dimensional space in which a mathematical model for the object of analysis is constructed; a plurality of subspace image generating means for generating subspace images within the prescribed time interval, the subspace images representing the results of the simulations performed for the respective subspaces by corresponding ones of the plurality of subspace simulation means; an entire image generating means for generating an entire image within the prescribed time interval by blending together the subspace images generated by the plurality of subspace image generating means, the entire image representing the result of the simulation of the entire object of analysis; and a display means for displaying within the prescribed time interval the entire image generated by the entire image generating means.

According to this invention, the behavior of the object of analysis is divided into a plurality of subspaces for simulation, and the results of the simulations are immediately visualized. Then, the result of the simulation of the object of analysis is visualized by blending the subspace images together.

In a simulation system and method having a second image generating function, each of the subspace simulation means calculates voxel values for a plurality of voxels created by dividing a corresponding one of the subspaces.

According to this invention, the simulation computation is performed on a voxel-by-voxel basis, the voxels being elements obtained by dividing the subspace into cubes.

In a simulation system and method having a third image generating function, each of the subspace image generating means generates the subspace image by blending together, in accordance with a multiple sheared superposition method, the voxel values computed by simulation by a corresponding one of the subspace simulation means.

According to this invention, the voxel values in the subspace are blended together by using the multiple sheared composition method.

In a simulation system and method having a fourth image generating function, the subspace images generated by the plurality of subspace image generating means are blended together, based on priorities determined among the subspace images in accordance with a binary space partitioning method.

According to this invention, the subspace images are blended together, based on the priorities determined in accordance with the BPS method.

In a simulation system and method having a fifth image generating function, the entire image generating means comprises a plurality of composited image generating means arranged in a hierarchical manner, each for generating a composited image by blending together two subspace images based on an occlusion relationship between the two subspace images.

According to this invention, the entire image generating means is constructed from a plurality of composited image generating means arranged in a pipelined structure.

In a simulation system and method having a sixth image generating function, each of the composited image generating means comprises: a priority judging means for judging priority between the two subspace images; a switching means for switching connections between two input images and two output images based on the result of the judgement made by the priority judging means; and an image blending means for outputting a composited image by blending together the output images output from the switching means in accordance with a blending equation.

According to this invention, each composited image generating means is constructed by combining hardware pieces each having a specific function.

4. BRIEF DESCRIPTION OF THE DRAWINGS

FIG. 6 is a perspective view showing one subspace.

FIG. 8 is a diagram for explaining an MS composition method.

5. BEST MODE FOR CARRYING OUT THE INVENTION

Figure 1:
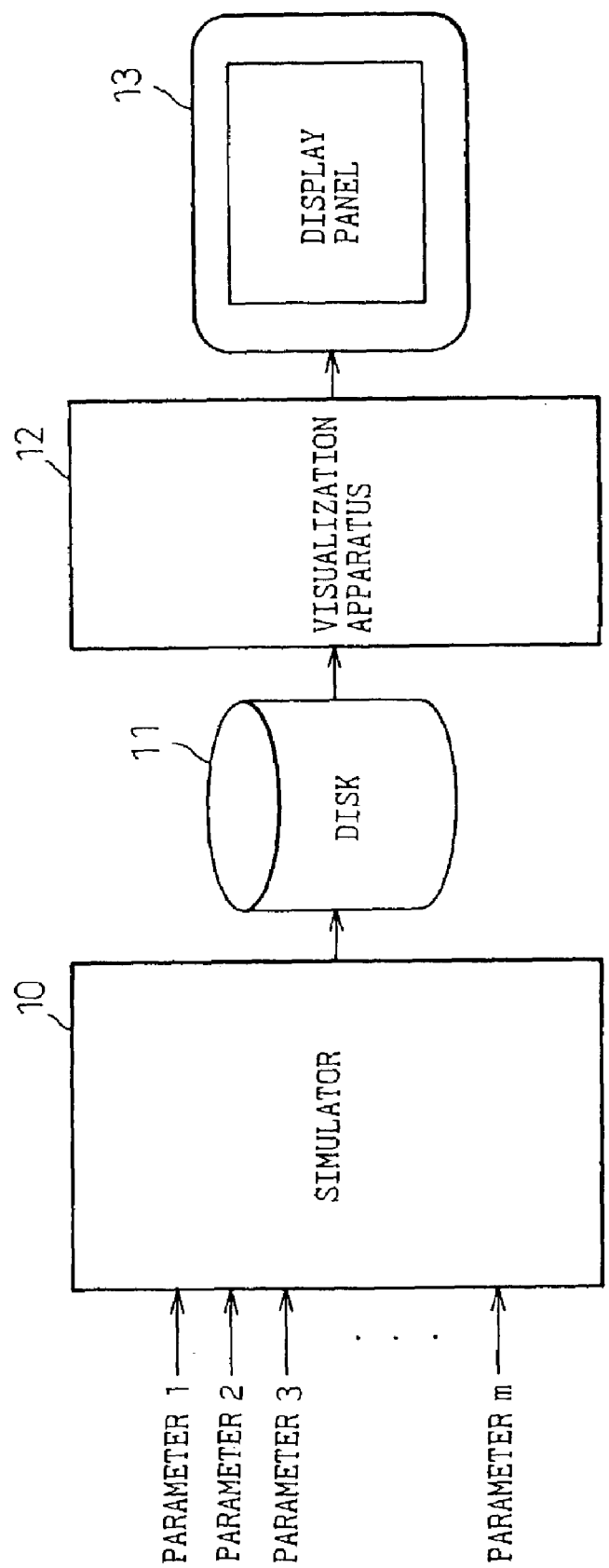
FIG. 1 is a diagram showing the configuration of a simulation system according to the prior art.
Figure 2:
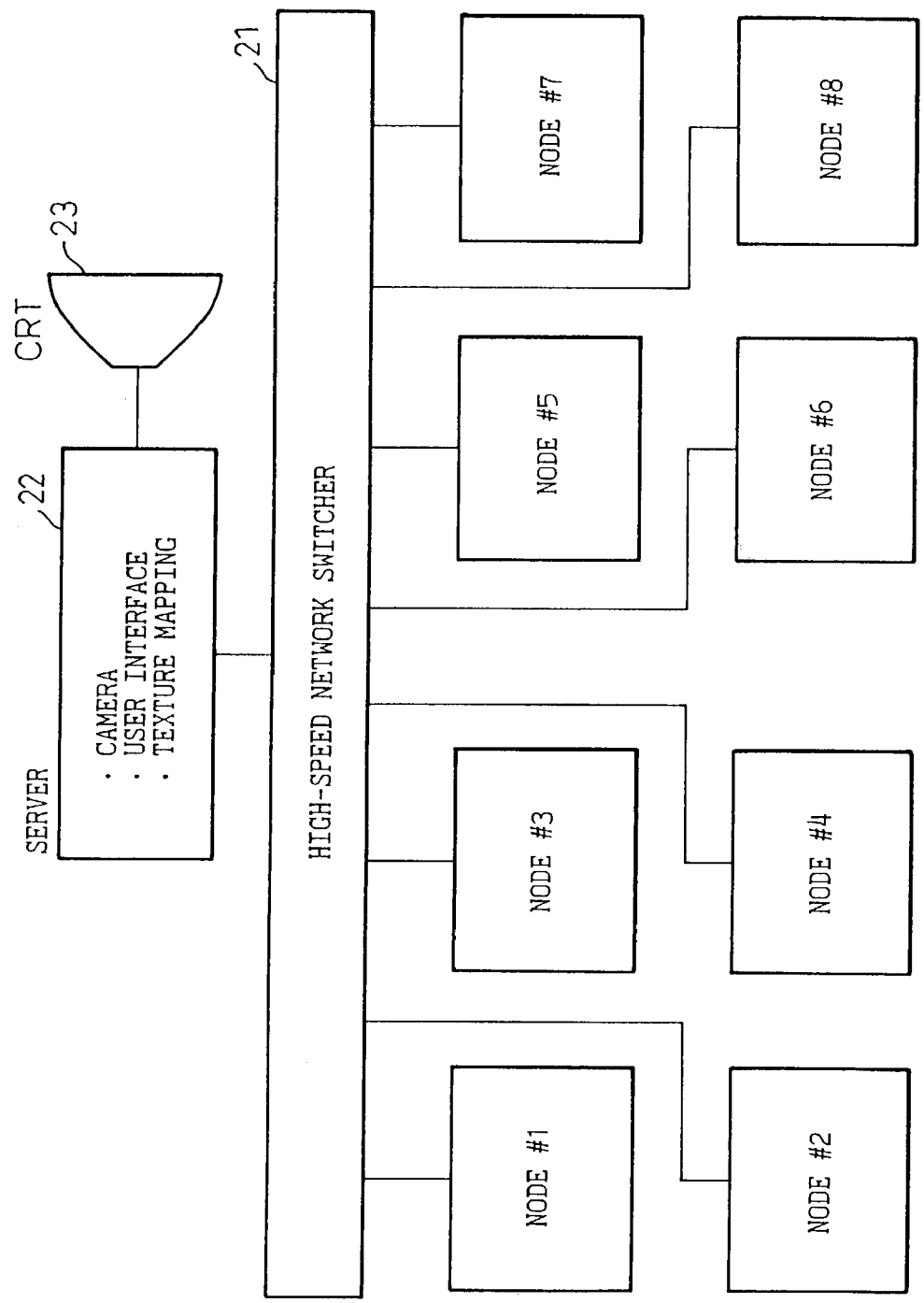
FIG. 2 is a diagram showing the configuration of a distributed simulation system according to the prior art.
Figure 3:
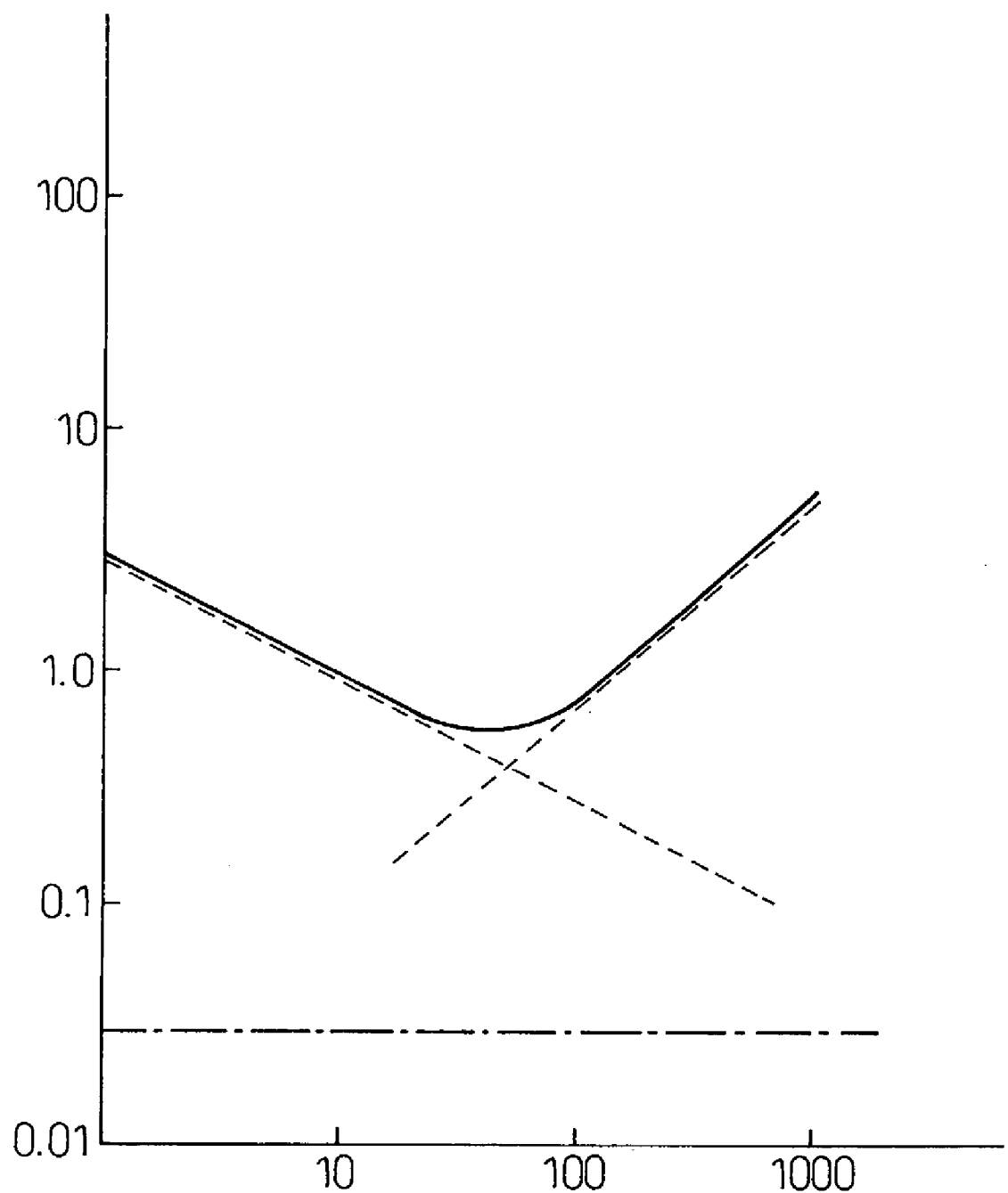
FIG. 3 is a graph showing the relationship between the number of parallel-connected computers and the processing time.
Figure 4:
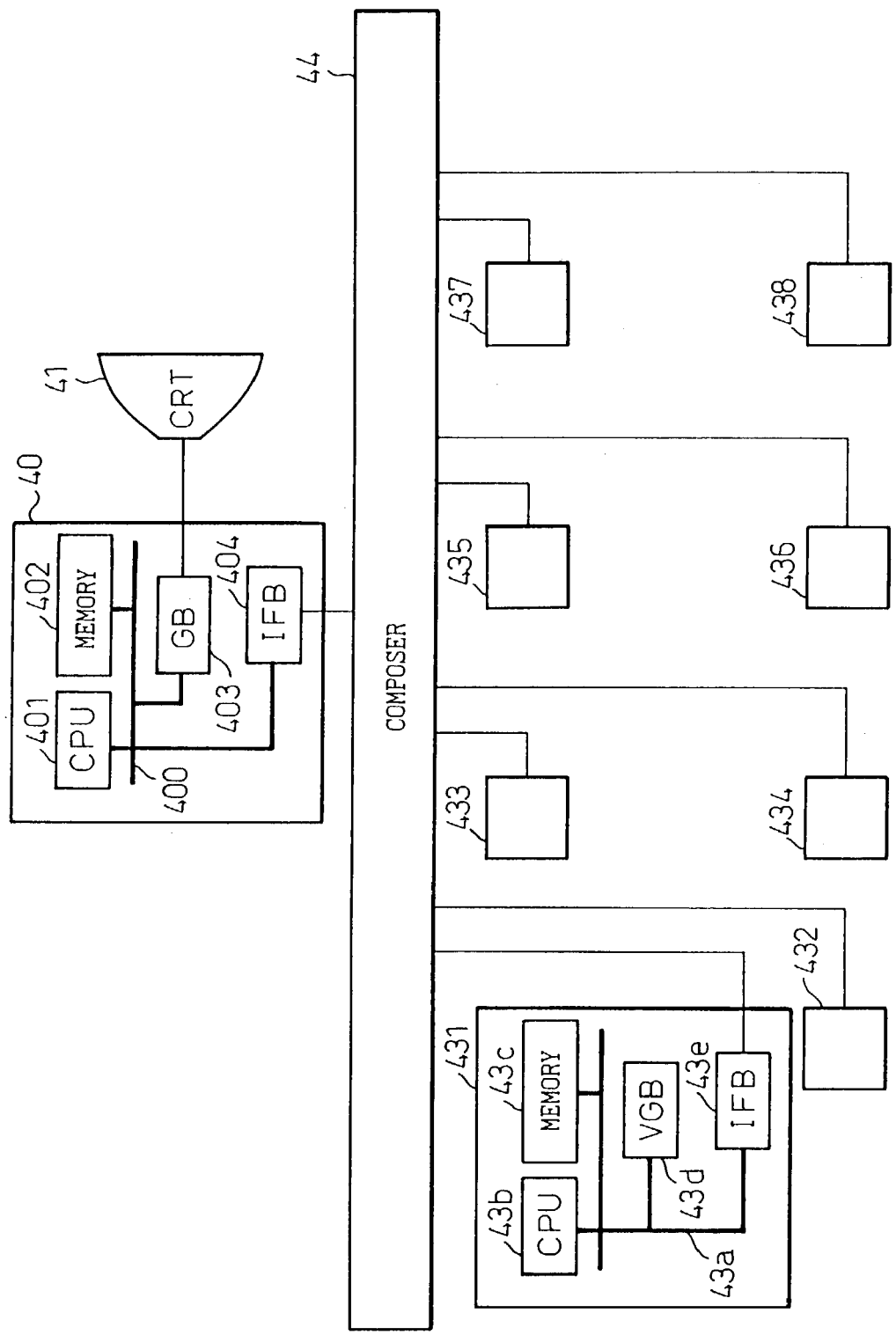
FIG. 4 is a diagram showing the configuration of a simulation system according to the present invention.

FIG. 4 is a diagram showing the configuration of a simulation system according to the present invention; as shown, the simulation system 4 comprises a server 40 which controls the entire system, a display apparatus (for example, CRT) 41 which displays an image, a plurality of nodes 431 to 438 which perform simulation and visualization processing for a plurality of subspaces created by dividing the three-dimensional space in which an object of analysis mode is constructed, and a composer 44 which combines the outputs of the nodes 431 to 438 and supplies the result to server.

The server 40 comprises a CPU 401, a memory 402 which stores a program to be executed by the CPU 401 and the results of processing performed by the CPU 401, a graphics board (GB) 403 which outputs a moving image signal to the display apparatus 41, and an interface board (IFB) 404 for interfacing with the composer 44; these constituent elements are interconnected via a bus 400.

The nodes 431 to 438 are identical in configuration, that is, each node comprises a CPU 43b which performs simulation for the subspace in which a portion of the object of analysis is constructed, a memory 43c which stores a simulation program to be executed by the CPU 43b and the result of the simulation performed by the CPU 43b, an image generating engine board (VGB) 43d which generates an image representing the result of the simulation for the subspace, and an interface board (IFB) 43e for interfacing with the composer 44; these elements constituent are interconnected via a bus 43a.

In the above embodiment, it is assumed that the result of the simulation in each of the servers 431 to 438 is generated using a dedicated image generating engine, but if the CPU 43b has a high-speed processing capability, the image may be generated by software using an image generating program.

Figure 5:
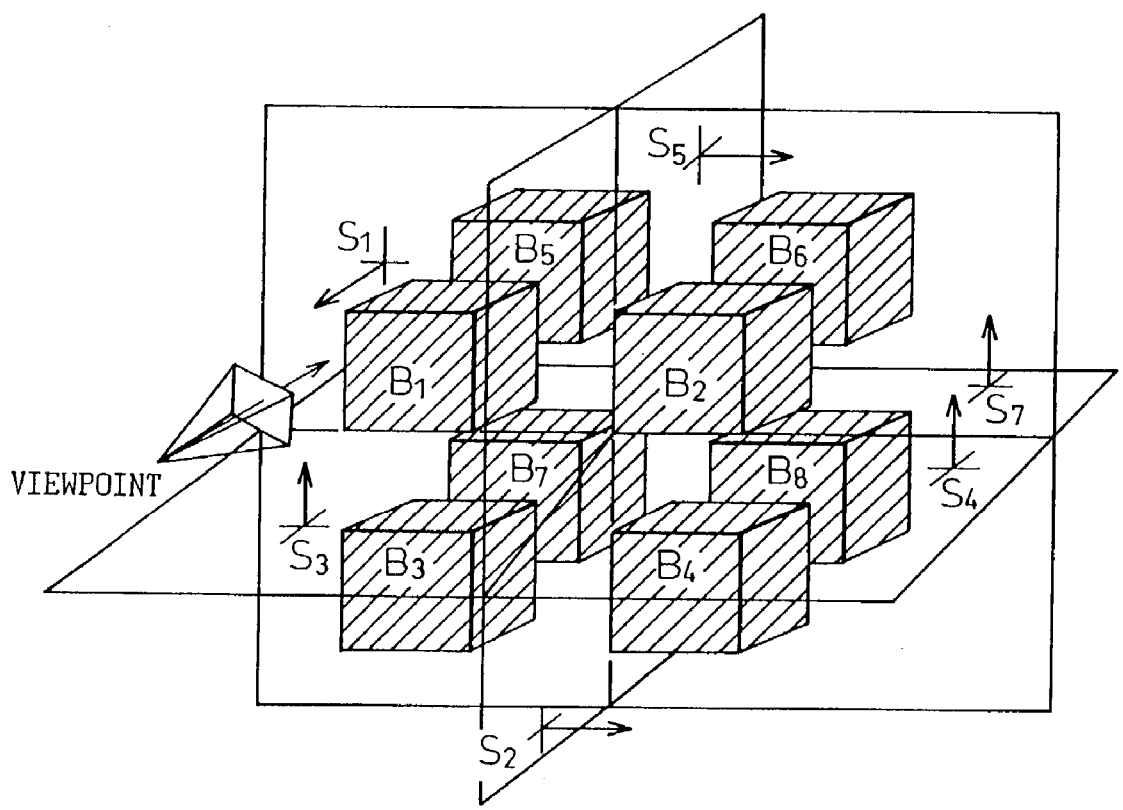
FIG. 5 is a diagram for explaining a method of subspace division.

FIG. 5 is a diagram for explaining a method of subspace division, illustrating the case where the three-dimensional space B in which the object of analysis is constructed, is divided into eight subspaces B1 to B8. The object of analysis contained in the subspaces B1 to B8 are directly incorporated into the respective nodes 431 to 438.

FIG. 6 is a perspective view showing one subspace Bi; the subspace Bi is divided into a plurality of voxels v (i, j, k), and by performing a simulation, a set of voxel values is computed for each voxel v (i, j, k).

The kind of physical quantity that the voxel values represent depends on the kind of object of analysis. For example, when simulating the weather on the earth, the voxel values represent the temperature, atmospheric pressure, wind direction, wind velocity, etc. at one specific point in the atmosphere. In this way, what the voxel values represent is not limited to one kind of physical quantity, but may include more than one kind of physical quantity.

The number of subspaces is not specifically limited, but to facilitate the composition of the images generated in the respective subspaces, it will be advantageous to divide the three-dimensional space into a plurality of subspaces, in particular, $2^{3n}$ subspaces (where n is a positive integer).

To visualize the result of the simulation, the voxel values are converted to color information in accordance with a predetermined rule. For example, in the case of temperature, the voxel values are converted to red for high temperature, blue for low temperature, and yellow for medium temperature.

Figure 7:
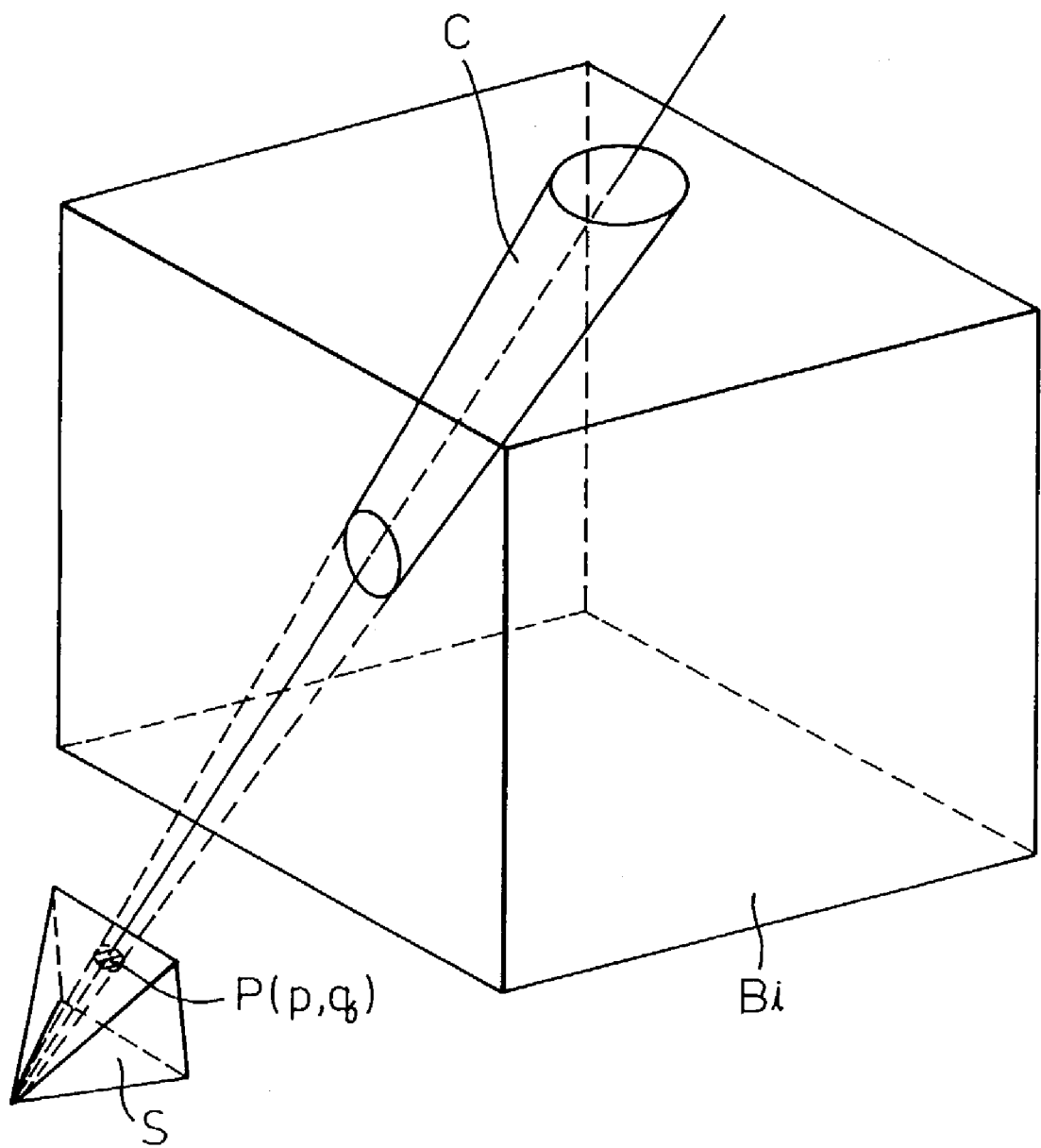
FIG. 7 is a diagram for explaining a method of subspace image generation.

FIG. 7 is a diagram for explaining a method of subspace image generation that uses a ray casting method (RC method) in which the color of a pixel (p, q) on a screen S is given as a superposition integral of the color information of the voxels contained in a circular pillar C within the subspace Bi.

However, as the field of view becomes wider with increasing distance from the screen S, the diameter of the circular pillar C increases with increasing distance from the screen; as a result, as the distance from the screen increases, the range of the superposition integration increases, and the computation of the superposition integral becomes more complex.

In view of this, the present invention employs, a multiple sheared composition method (MS method) to facilitate image generation.

FIG. 8 is a diagram for explaining the MS method; part (A) shows the case in which the RC method shown in FIG. 7 is applied, while part (B) shows the case in which the MS method is applied.

That is, in the MS method, the subspace is distorted, and an image is generated on a reference plane by projecting the voxels in the distorted subspace onto the reference plane by using parallel light rays perpendicular thereto; by so doing, pixel values on the reference plane can be calculated by simple addition.

The subspace image, the image generated by the MS method for the subspace, is transmitted from each node to the composer 44 where the subspace images from the respective nodes are blended together to generate an entire image representing the entire object of analysis.

To generate the entire image, occlusion relationships among the subspace images must be determined based on the viewpoint and the positional relationships among the subspaces. A method for determining occlusion relationship will be described with reference to FIG. 5.

First, the eight subspaces B1 to B8 are separated from each other by seven separate planes S1 to S7. That is, the entire space is partitioned by the first separate plane S1 into the first subspace group B1–B4 and the second subspace group B5–B8. Next, the first subspace group is partitioned by the second separate plane S2 into the 1-1st subspace group B1, B2 and the 1–2nd subspace group B3, B4. Further, the 1-1st subspace group is partitioned by the third separate plane S3 into the 1-1-1st subspace group B1 and the 1-1-2nd subspace group B2. In this way, the space is divided iteratively until only one subvolume is contained in each of the spaces separated by the separate planes. Then, the highest priority is assigned to the image Ii corresponding to the subvolume Bi contained in the space closest to the viewpoint. That is, higher priority is given to the images Ii corresponding to the subspaces Bi closer to the viewpoint, and the entire structure is thus described in the form of a BSP (Binary Space Partitioning) tree.

Figure 9:
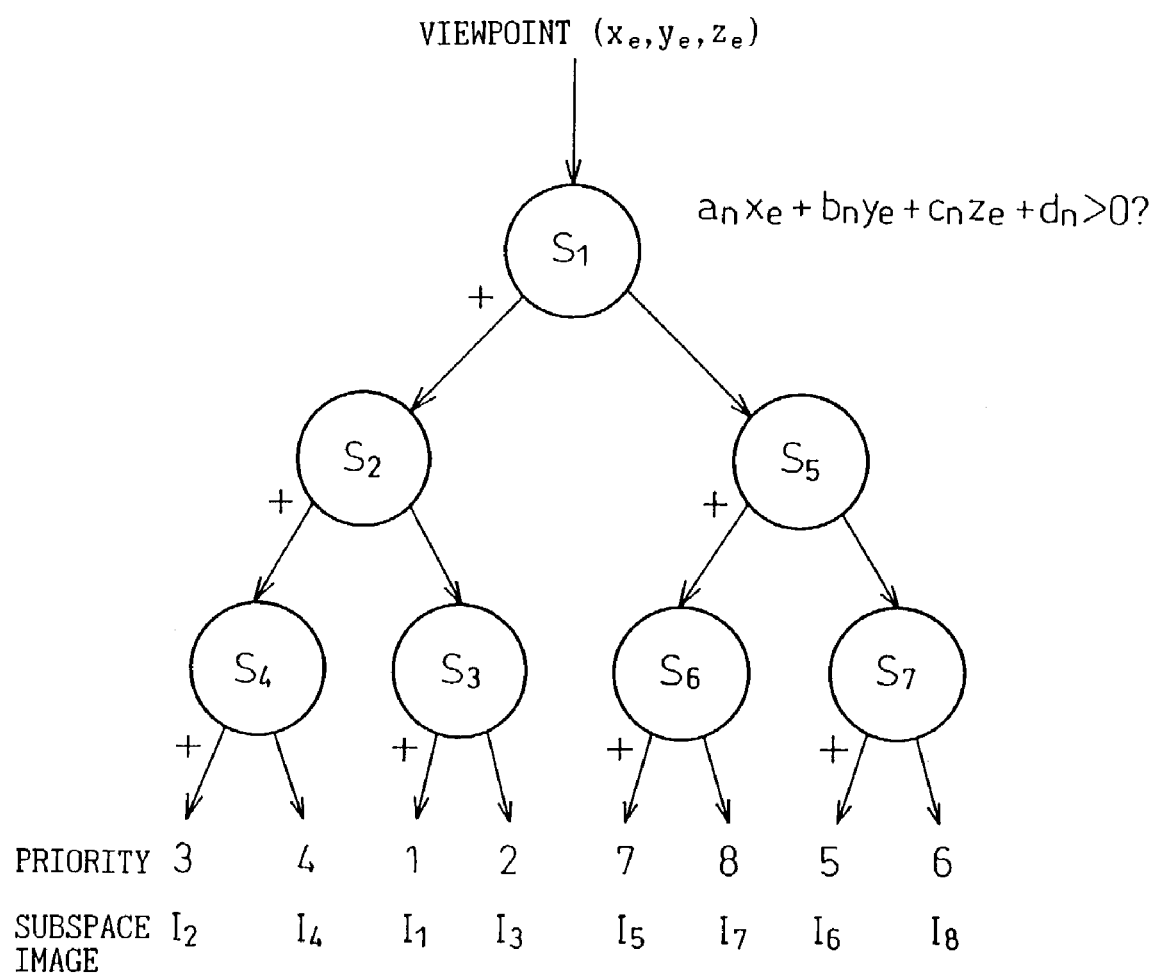
FIG. 9 is a diagram showing a BPS tree structure.

FIG. 9 is a BSP tree representation of FIG. 5; as shown, priority "1" is assigned to the image I1 corresponding to the subspace B1, the priority decreasing in the order of the images I3, I2, I4, I6, I8, I5, and I7.

Next, a description will be given of how the subspace images are blended.

When light emitted from a light source reaches a point (p, q) on the screen by passing through the three-dimensional space in which the analytical model is constructed, the brightness Ic at that point (p, q) is expressed by [Equation 1].

$$I_{pq} = \int_{S0}^{S1} L(S)e^{-\int_0^s \mu(t)dt}dS \qquad \text{[Equation 1]}$$

where $\mu(t)$ is the attenuation factor at position t on the light ray, L(s) is the brightness at position s on the light ray, S0 is the starting point of the light ray, and S1 is the terminating point of the light ray.

When [Equation 1] is discretized assuming that $\Delta s = \Delta t$, [Equation 2] is obtained.

$$I_{pq} = \sum_{i=0}^{N-1}\left(Li\Delta S \prod_{j=0}^{i-1} e^{-\mu i \Delta S}\Delta S\right) = \sum_{i=0}^{N-1}\left(Ci\prod_{j=0}^{i-1}\alpha i\right) \qquad \text{[Equation 2]}$$

When [Equation 2] is expanded, [Equation 3] is obtained.

$IC=\{C0+C1\alpha0+C2\alpha0\alpha1+C3\alpha0\alpha1\alpha2+\ldots+$
$Ck-1\alpha0\alpha1\ldots\alpha k-1\}+\{\alpha0\alpha1\ldots\alpha k-1Ck+$
$\alpha0\alpha1\ldots\alpha k-1Ck+1\alpha k+\alpha0\cdot\alpha1\ldots\alpha k-1CN-$
$1\alpha k\ldots\alpha N-2\}=IA+AA\cdot IB$ $AC=AA\cdot AB$ [Equation 3]

where $AA=\alpha0\alpha1\ldots\alpha k-1$ $AB=\alpha k\alpha k+1\ldots\alpha N-1$ $IA=C0+C1\alpha0+\ldots+Ck-1\alpha0\ldots\alpha k-1$ $IB=Ck+Ck+1\alpha k+\ldots+CN-1\alpha k\ldots\alpha N-2$ As can be seen from [Equation 3], when two images whose brightnesses are represented by IA and IB, respectively, are blended using [Equation 3], the brightness of the resulting composited image can be obtained. The above description has dealt with the case where the number of divisions is two, but it is apparent that the same blending method can also be applied to the case where the number of divisions is larger than two.

Figure 10:
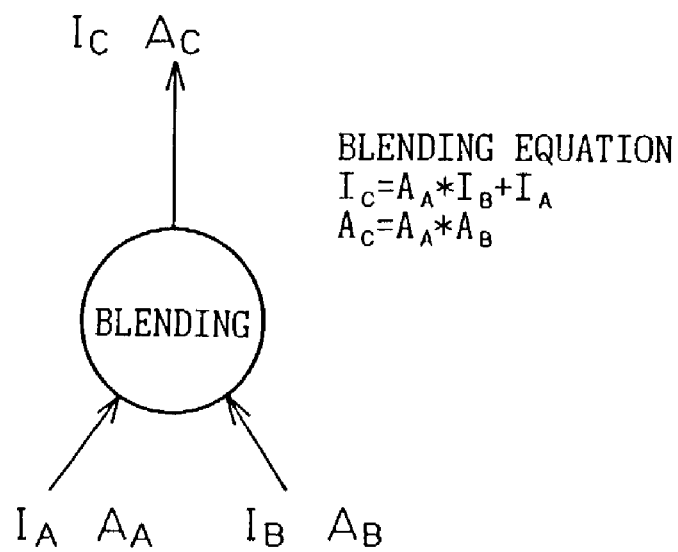
FIG. 10 is a diagram for explaining a blending method.

FIG. 10 is a diagram for explaining the blending method; as shown, when two images whose brightnesses are IA and IB, and whose transmittances are AA and AB, respectively, are blended in accordance with the blending equation shown in [Equation 3], the resulting composited image has brightness Ic and transmittance Ac.

Figure 11:
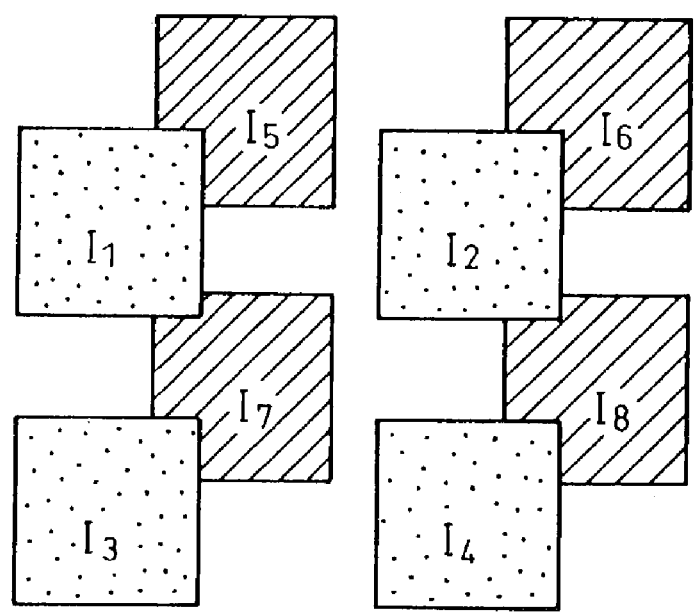
FIG. 11 is a diagram showing occlusion relations.

FIG. 11 is a diagram showing the occlusion relationships among the images corresponding to the eight subvolumes B1 to B8 based on the BPS tree shown in FIG. 9.

Figure 12:
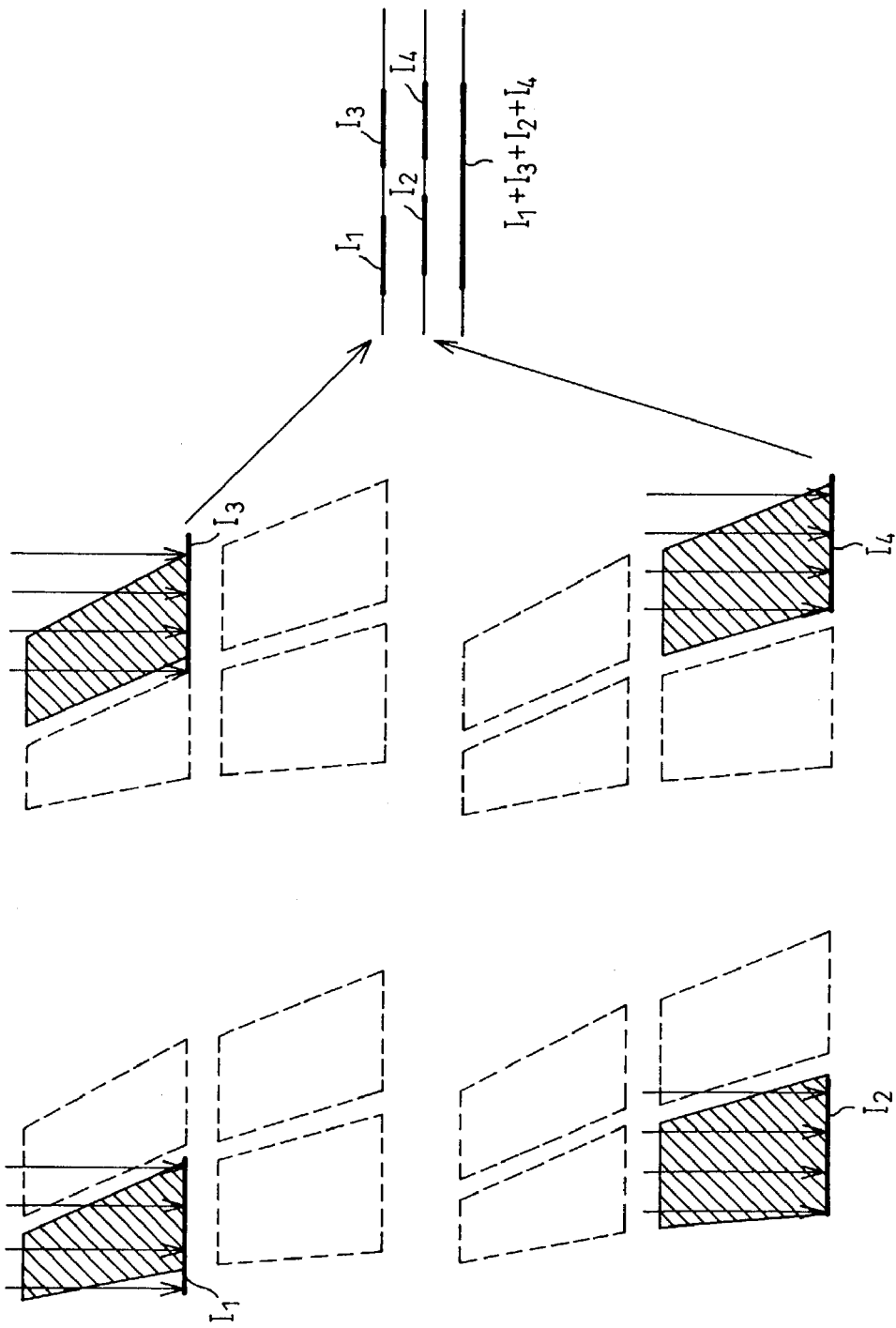
FIG. 12 is a diagram (1/2) for explaining the blending process.

FIG. 12 is a diagram (part 1) for explaining the blending process, in which the image I1 of the subspace B1 is generated by the server 431, the image I2 of the subspace B2 by the server 432, the image I3 of the subspace B3 by the server 433, and the image I4 of the subspace B4 by the server 434.

The images I1 to I4 are transmitted to the composer 44 where the images are blended together in accordance with the blending equation of FIG. 10 to generate I1+I2+I3+I4.

Figure 13:
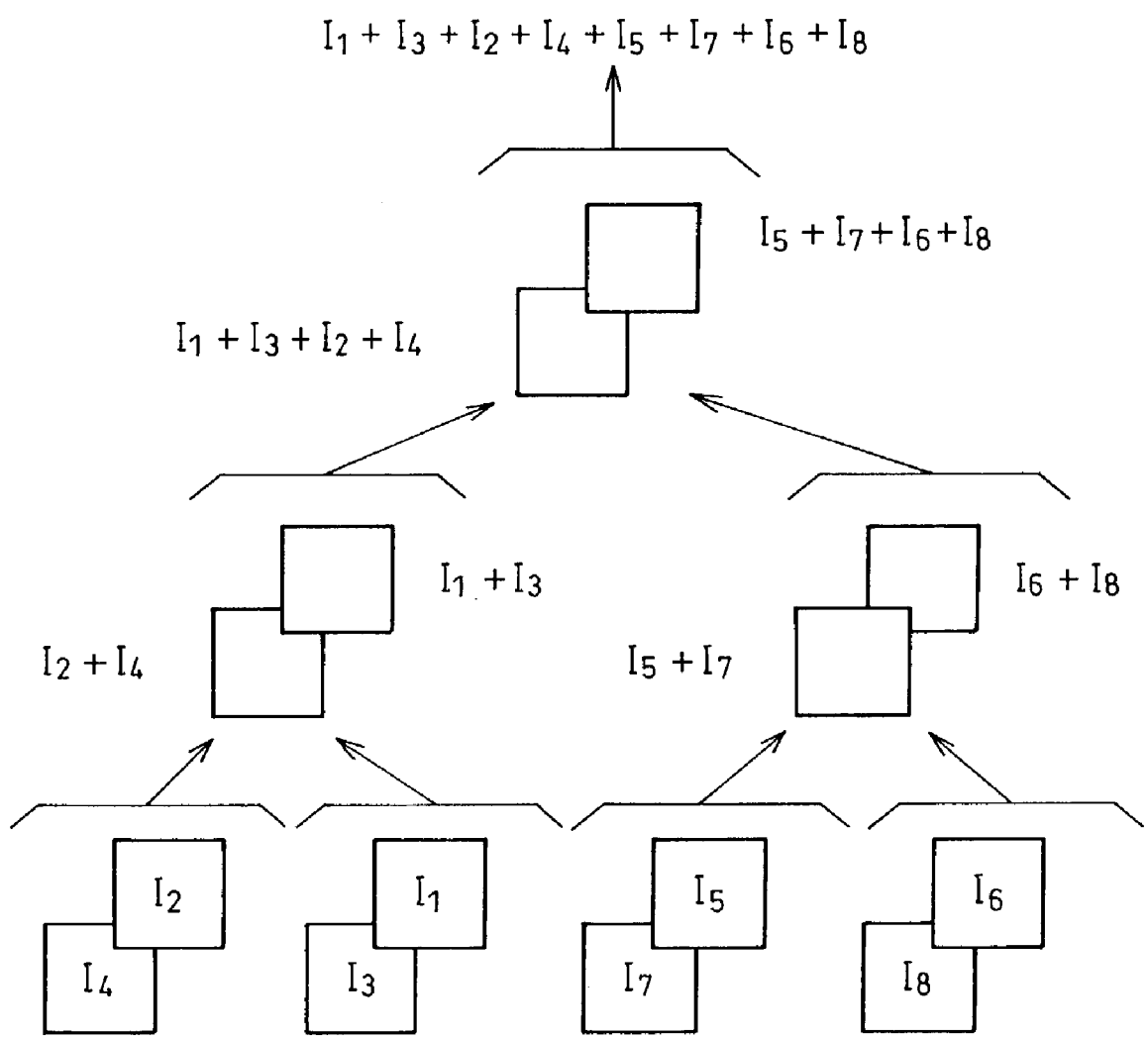
FIG. 13 is a diagram (2/2) for explaining the blending process.

FIG. 13 is a diagram (part 2) for explaining the blending process, in which the images I1 to I8 are blended together to generate the image representing the result of the simulation of the entire object of analysis.

The composer 44 for blending the images can be implemented in software, but it is advantageous to use a so-called pipelined computer that performs parallel computations in order to speed up processing.

Figure 14:
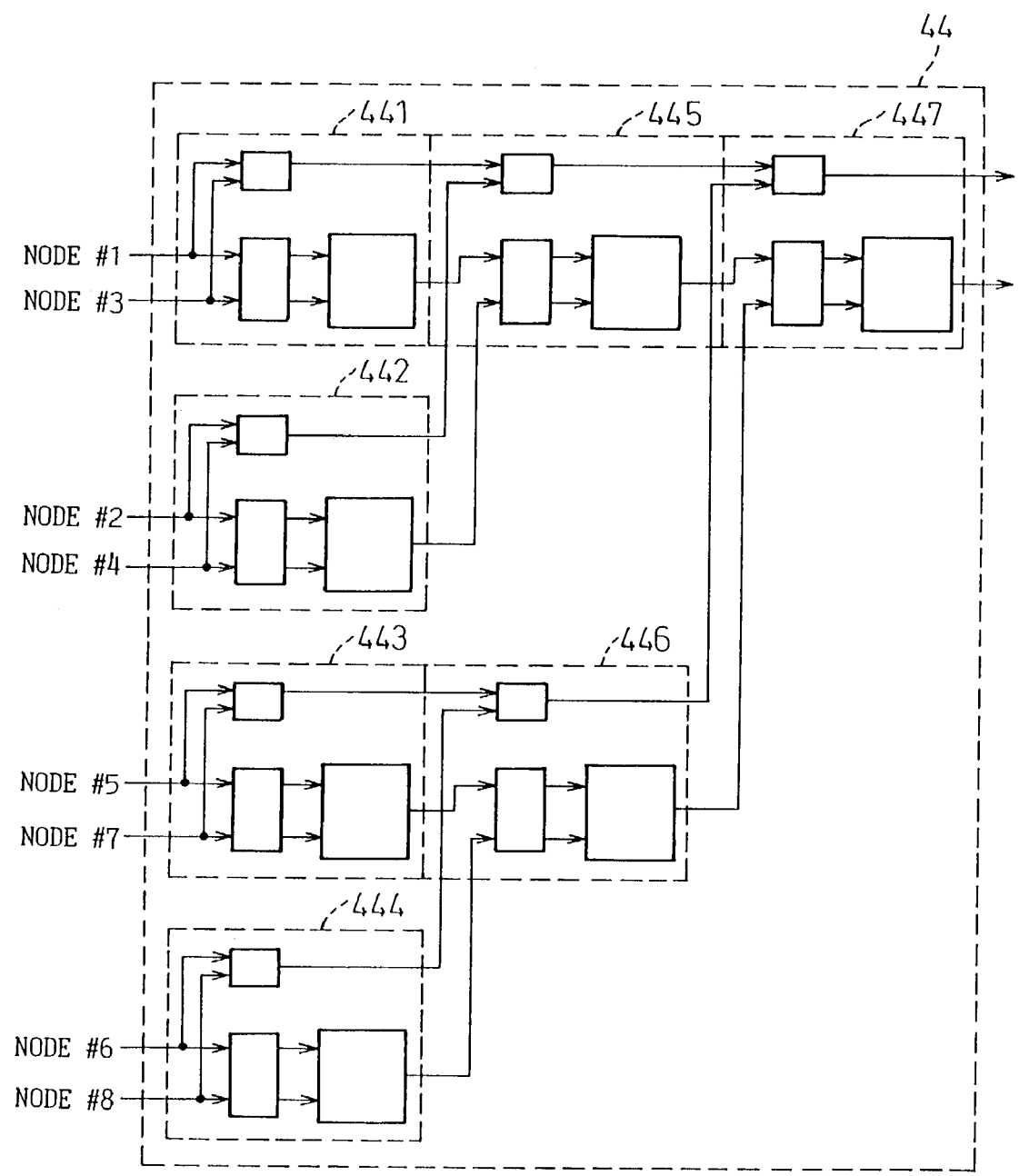
FIG. 14 is a diagram showing the configuration of a pipelined composer.

FIG. 14 is a diagram showing the configuration of the pipelined composer; as shown, the composer 44 comprises seven mergers 441 to 447 in order to combine eight images.

Figure 15:
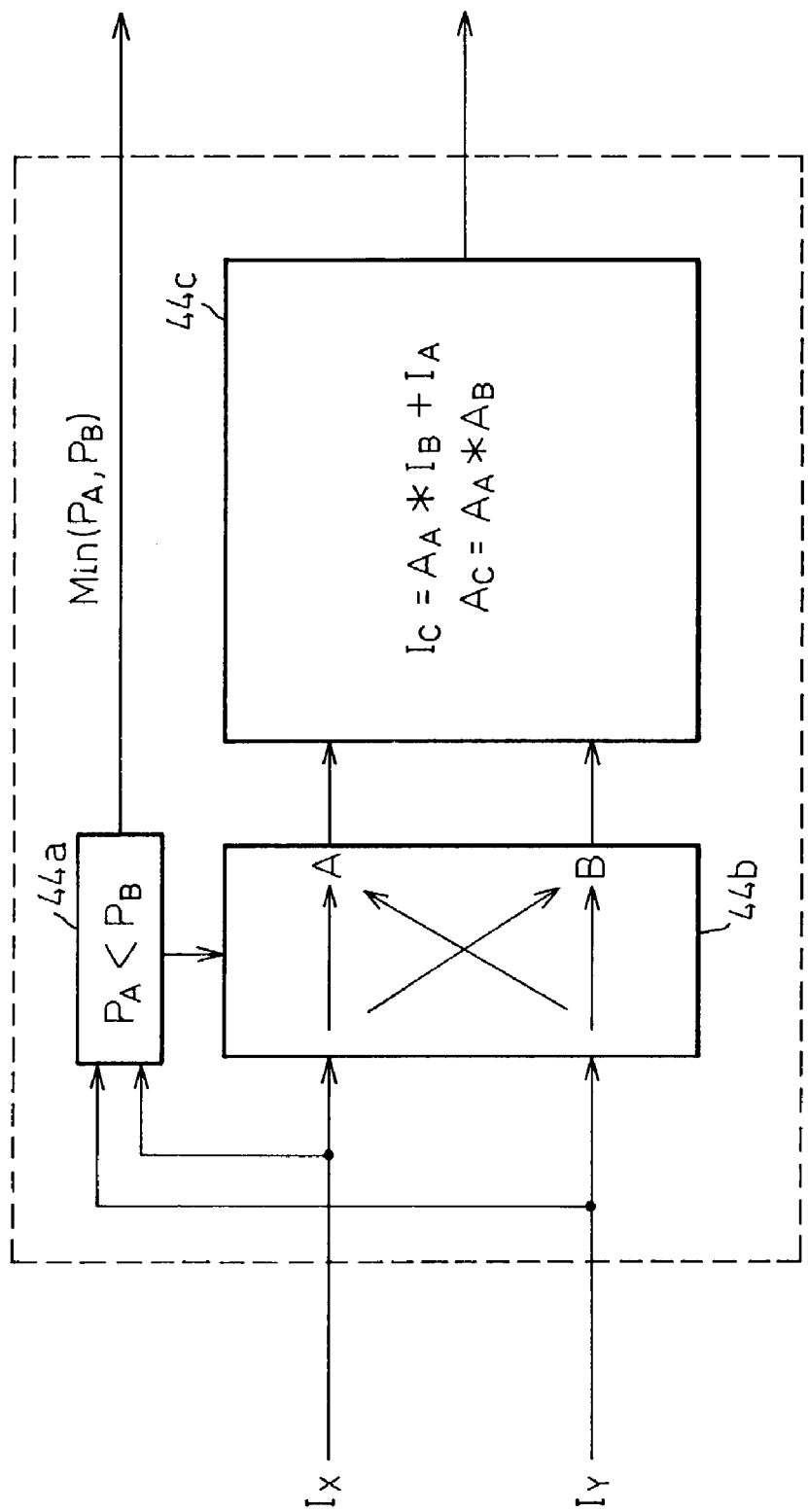
FIG. 15 is a diagram showing the configuration of a merger.

FIG. 15 is a diagram showing the detailed configuration of one merger; as shown, each merger comprises a priority judging section 44a, a selector 44b, and a blender 44c.

That is, outputs from nodes X and Y are input to the priority judging section 44a as well as to the selector 44b. The priority judging section checks the occlusion relationship between the image IX generated by the node X and the image IY generated by the node Y, and sends a control command to the selector 44b.

For example, when the priority of IY is high and the priority of IX is low, cross paths in the selector 44b are selected, thus connecting the output of the node X to the output port B of the selector 44b and the output of the node Y to the output port A of the selector 44b. Conversely, when the priority of IY is low and the priority of IX is high, straight paths in the selector 44b are selected, thus connecting the output of the node X to the output port A of the selector 44b and the output of the node Y to the output port B of the selector 44b.

Then, the blender 44c blends together the two outputs of the selector 44b in accordance with the blending equation of FIG. 10, and outputs the intensity and transmittance of the composited image.

Turning back to FIG. 14, when the simulation system comprises eight servers 441 to 448, the composer 44 is constructed by arranging the seven mergers 441 to 447 in three stages.

More specifically, the first merger 441 blends the images I1 and I3, the second merger 442 blends the images I2 and I4, the third merger 443 blends the images I5 and I7, and the fourth merger 444 blends the images I6 and I8.

The fifth merger 445 blends the outputs of the first merger 441 and second merger 442, and the sixth merger 446 blends the outputs of the third merger 443 and fourth merger 444. Finally, the seventh merger 447 blends the outputs of the sixth merger 446 and seventh merger 447, and thus produces the output of the composer 44.

The above embodiment has been described for the composer when the number of servers is eight; on the other hand, when the number of servers is nine or larger, these servers can be accommodated by stacking composers each of which consists of eight servers.

The output of the composer 44 is transmitted to the server 40 and displayed on the display apparatus 41; here, as the composited image is generated using the MS method, the image must be corrected for distortion by using a known texture mapping function before displaying it on the display apparatus 41.

Figure 16:
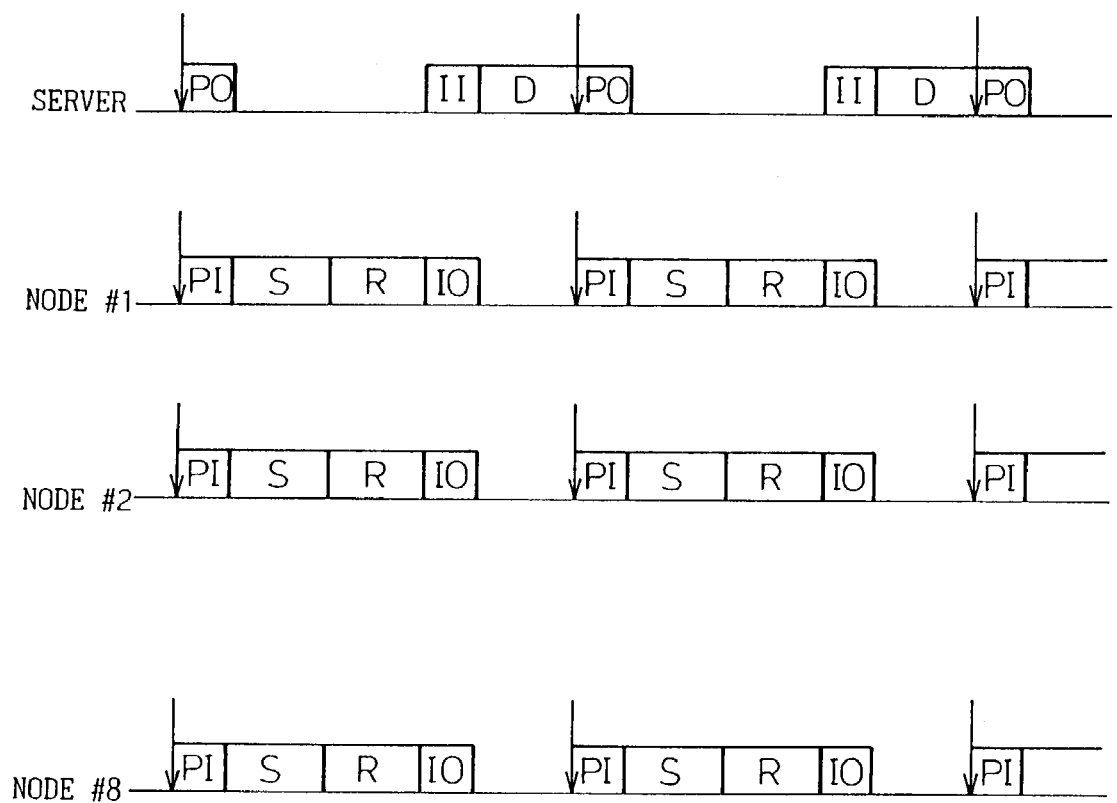
FIG. 16 is an operation timing diagram for the simulation system according to the present invention.

FIG. 16 is an operation timing diagram for the simulation system according to the present invention: the uppermost part shows the operation timing for the server, and the second and lower parts show the operation timings for the nodes #1 to #8, respectively.

The server, for example, generates a timing pulse to synchronize the operation between the server and each node.

When the timing pulse is detected, the server outputs simulation conditions, image viewing position, etc. as parameters to each server.

Upon receiving the parameters, each node performs a simulation for the subspace to be analyzed, and then visualizes the result of the simulation in the form of a subspace image which is output.

The server collects the subspace images from the respective nodes, blends the subspace images in the composer and, after correcting for distortion, displays the image representing the entire space.

Figure 17:
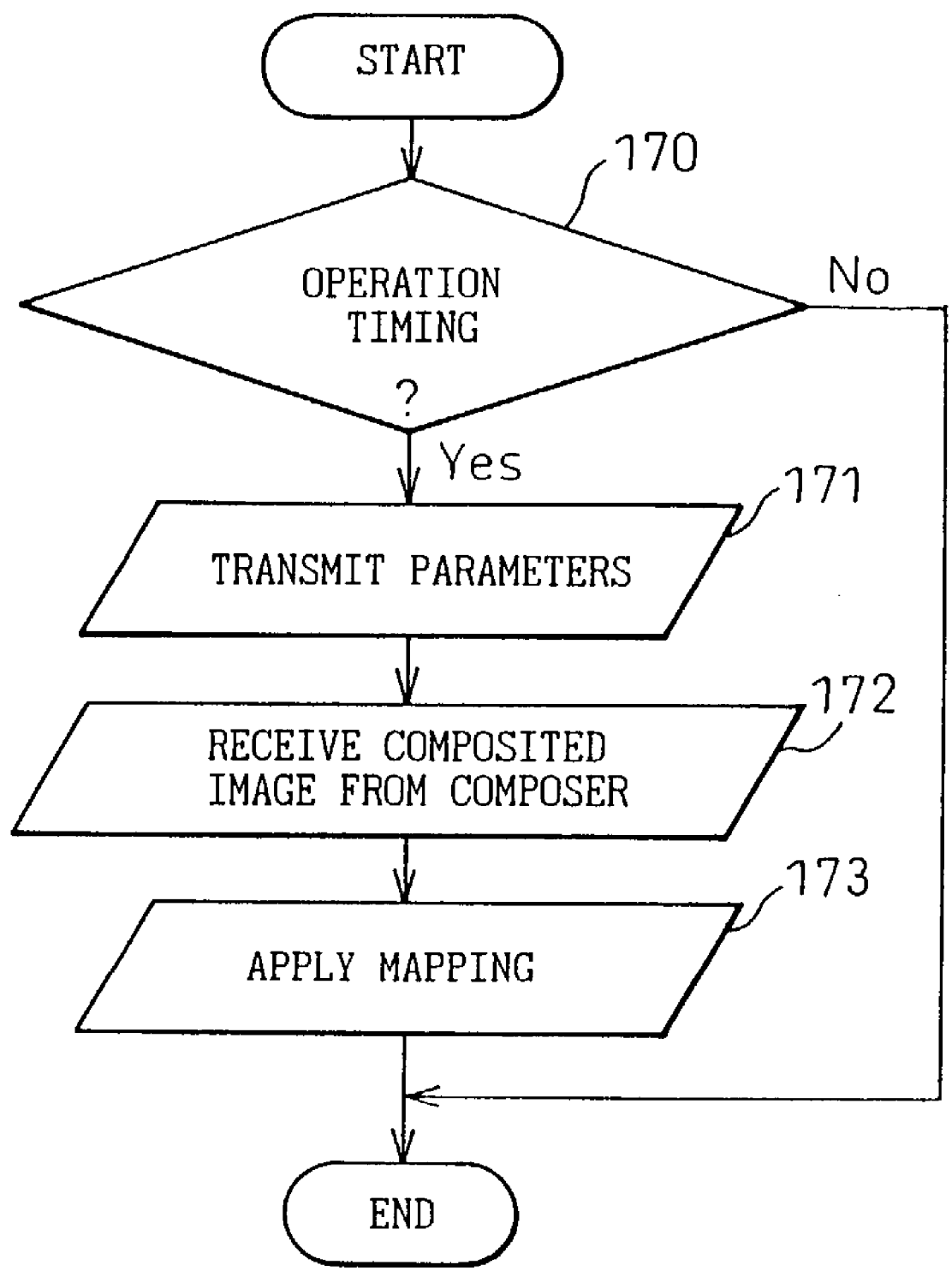
FIG. 17 is a flowchart illustrating a server processing routine.

FIG. 17 is a flowchart illustrating the server processing routine executed in the server; first, at step 170, it is determined whether an operation timing has occurred, and if not, the routine is immediately terminated.

If the answer at step 170 is Yes, that is, if an operation timing has occurred, then at step 171 parameters such as simulation conditions and image viewing position are supplied as parameters to each node.

Next, at step 172, the composited image is received from the composer, and at step 173, mapping is applied to correct for distortion before displaying the image on the display apparatus, after which the routine is terminated.

Figure 18:
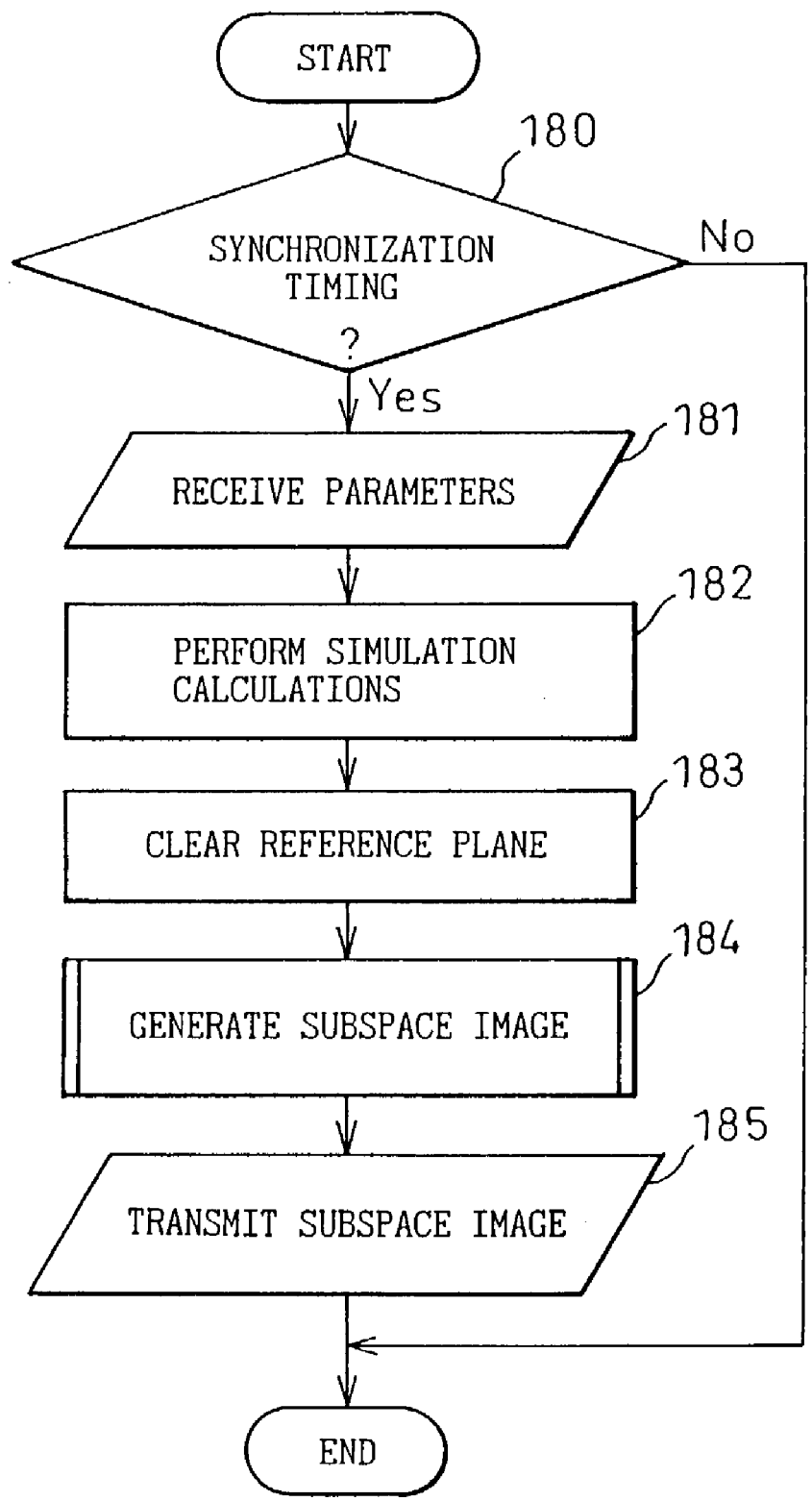
FIG. 18 is a flowchart illustrating a node processing routine.

FIG. 18 is a flowchart illustrating the node processing routine executed in each node; first, at step 180, it is determined whether or not an operation timing is accomplished, and if not, the routine is immediately terminated.

If the answer to step 180 is Yes, that is, if an operation timing has occurred, then at step 181 parameters such as simulation conditions and image viewing position are received from the server. Next, at step 182, simulation is performed for the subspace, and at step 183, the reference plane is cleared in order to generate a subspace image.

At step 184, a subspace image generation routine is executed as will be described in detail hereinafter. Finally, at step 185, the subspace image is transmitted to the server, upon which the routine is terminated.

Figure 19:
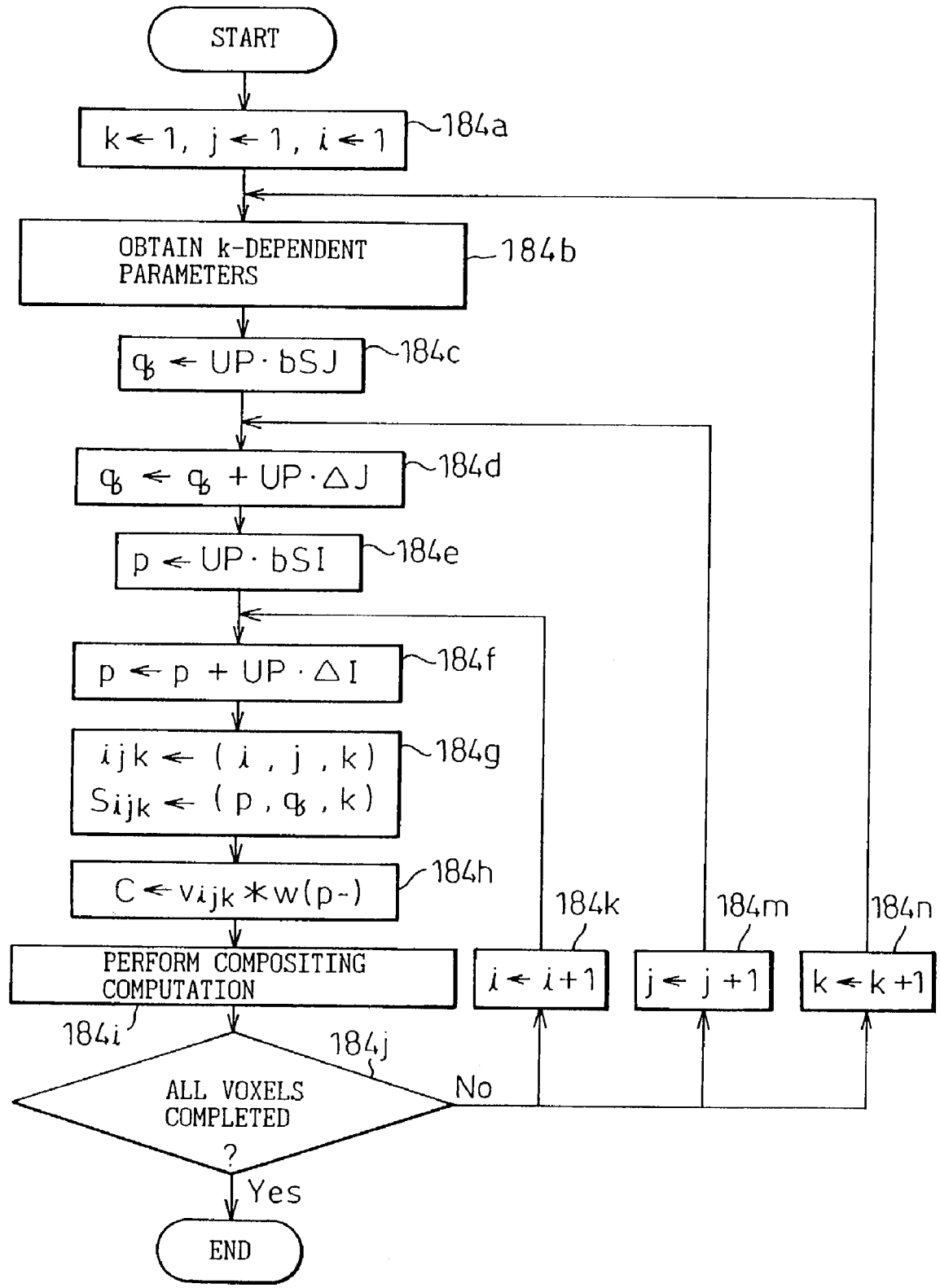
FIG. 19 is a flowchart illustrating a subspace image generation routine.

FIG. 19 is a flowchart illustrating the details of the subspace image generation routine to be performed at step 184 of the node processing routine; first, at step 184a, indices (i, j, k) indicating voxel addresses in the subspace are each initialized to "1". Here, i and j are addresses along axes intersecting at right angles in the reference plane, and k is an address along an axis perpendicular to the reference plane.

At step 184b, four parameters (UP·ΔI, UP·ΔJ, UP·bSI, and UP·bSJ), each of which varies as a function of k, are obtained. Here, UP·ΔI and UP·ΔJ are the amounts of increase along the i axis and j axis, respectively, that is, the amounts of increase in coordinates along the i axis and j axis between deformed voxels. UP·bSI and UP·bSJ are the coordinates, along the i axis and j axis, of a side edge of a subvolume deformed by the MS method.

At step 184c, the initial value of q in the coordinates (p, q) of a specific point on the reference plane is set as UP·bSJ, and at step 184d, the amount of increase in the j direction is added to q to update q.

At step 184e, the initial value of p is set as UP·bSI, and at step 184f, the amount of increase in the i direction is added to p to update p.

At step 184g, parameter ijk, which indicates the voxel position before the deformation, and parameter Sijk, which indicates the corresponding voxel position after the deformation, are obtained.

That is $$Sijk=(p, q, r)$$

At step 184h, to calculate the pixel value C of that specific point (p, q) on the reference plane, the voxel value Vijk of the corresponding voxel is extracted based on the parameter (i, j, k) indicating the voxel position. The voxel value vijk is a four-dimensional vector whose elements are red component R, green component G, blue component B, and transparency A.

Then, the pixel value C is calculated as the product of the voxel value vijk and weight function w.

$$C \leftarrow vijk*w(p-ip, q-jq)$$

Here, (ip, jq) are the i-axis and j-axis coordinates of the point on the reference plane corresponding to the voxel (i, j, k). The pixel value is also a four-dimensional vector whose elements are red component R, green component G, blue component B, and transparency A.

Finally, at step 184i, compositing computation is performed using [Equation 4] to update the composite pixel value Cc by compositing the composite pixel value Cc computed in the process up to the previous step with the pixel value C computed at step 284h.

$$\begin{bmatrix} Rc \\ Gc \\ Bc \end{bmatrix} = A * \begin{bmatrix} R \\ G \\ B \end{bmatrix} + \begin{bmatrix} Rc \\ Gc \\ Bc \end{bmatrix} \quad [\text{Equation 4}]$$

$$Ac=Ac*A$$

where $$Cc = \begin{bmatrix} Rc \\ Gc \\ Bc \\ Ac \end{bmatrix}$$

$$C = \begin{bmatrix} R \\ G \\ B \\ C \end{bmatrix}$$

At step 184j, it is determined whether all the voxels have been processed; if the processing along the i axis is not completed yet, i is incremented at step 184k, and the process returns to step 184f.

If the processing along the j axis is not completed yet, j is incremented in step 184m, and the process returns to step 184d, while if the processing along the k axis is not completed yet, k is incremented at step 184n, and the process returns to step 184b. When the processing on all the voxels has been completed, the routine is terminated.

In the simulation system and method having the image generating function according to the first invention, as simulation is performed by dividing a large-scale object of analysis into subspaces so that the result can be visualized for each subspace, the result of the simulation can be displayed at the video rate even when the node processing capability is not particularly high.

In the simulation system and method having the image generating function according to the second invention, since simulation computations are performed on voxels, visualization of the simulation result can be easily accomplished.

In the simulation system and method having the image generating function according to the third invention, image generation time can be shortened by generating subspace images using the MS method.

In the simulation system and method having the image generating function according to the fourth invention, occlusion relationships can be determined through recursive processing by using the BSP method.

In the simulation system and method having the image generating function according to the fifth invention, as the composer has a pipelined structure, the processing speed for blending the subspace images can be increased.

In the simulation system and method having the image generating function according to the sixth invention, as the merger is implemented by functional hardware, the processing speed for blending two images can be increased.

Description of Reference Numerals

40 . . . SERVER
41 . . . DISPLAY APPARATUS
431 TO 444 . . . NODE
44 . . . COMPOSER

What is claimed is:

1. A simulation system for simulating the behavior of an object of analysis, comprising:
a plurality of subspace simulation means for respectively simulating the behaviors of said object in a plurality of subspaces, which are created by dividing a three-dimensional space in which a mathematical model for said object of analysis is constructed, in every prescribed time interval;
a plurality of subspace image generating means for respectively generating subspace images by using independent memories, said subspace images representing the results of the simulations performed in said respective subspaces by a corresponding one of said plurality of subspace simulation means;
an entire image generation means for generating an entire image by blending together said subspace images generated by said plurality of subspace image generating means;
a plurality of subspace image transmitting lines for transmitting said subspace images generated by said plurality of subspace image generating means to said entire image generation means; and
a display means for displaying said entire image,
wherein said entire image generation means receives said subspace images transmitted via said subspace image transmitting lines in parallel and generates said entire image from said subspace images.

2. The simulation system as claimed in claim 1, wherein each of said subspace simulation means calculates voxel values for a plurality of voxels which are created by dividing a corresponding one of said subspaces.

3. A simulation system as claimed in claim 2, wherein each of said subspace image generating means generates said subspace image by blending together, in accordance with a multiple sheared composition method, said voxel values simulated by a corresponding one of said subspace simulation means.

4. The simulation system as claimed in claim 1, wherein said entire image generating means blends together said subspace images generated by said plurality of subspace image generating means, based on priorities determined in accordance with a binary space partitioning method.

5. The simulation system as claimed in claim 4, wherein said subspace images respectively include data indicating said priorities for every frame.

6. The simulation system as claimed in claim 4, wherein said priorities are expressed in a form of a binary space-partitioning tree.

7. The simulation system as claimed in claim 4, wherein said entire image generating means comprises a plurality of composite image generating means arranged in a hierarchical manner, each of said plurality of composite image generating means generating a composite image by blending together two subspace images according to a priority based on an occlusion relationship between said two subspace images.

8. The simulation system as claimed in claim 7, wherein each of said composite image generating means comprises:
a priority judging means for judging a priority between said two subspace images;
a switching means for switching connections between two input images and two output images based on a result of the judgement made by said priority judging means; and
an image blending means for blending together said output images output from said switching means to generate a composite image in accordance with a blending equation and outputting said composite image.

9. The simulation system as claimed in claim 8, wherein said image blending means blends first and second subspace images to generate said composite image in accordance with the following equation:

$$I_C = A_A * I_B + I_A$$

$$A_C = A_A * A_B$$

where $I_A$ is a brightness of said first subspace image, $A_A$ is a transparency of said first subspace image, $I_B$ is a brightness of said second subspace image, $A_B$ is a transparency of said second subspace image, $I_c$ is a brightness of said third subspace image and $A_c$ is a transparency of said third subspace image.

10. A simulation method for simulating the behavior of an object of analysis, comprising:
a plurality of subspace simulating steps for respectively simulating the behaviors of said object in a plurality of subspaces, which are created by dividing a three-dimensional space in which a mathematical model for said object of analysis is constructed, in parallel;
a plurality of subspace image generating steps for respectively generating and outputting subspace images in parallel, said subspace images representing the results of the simulations performed in said respective subspaces in a corresponding one of said plurality of subspace simulating steps;
an entire image generating step for receiving said subspace images in parallel and generating an entire image by blending together said subspace images generated in said plurality of subspace image generating steps; and
a displaying step for displaying said entire image generated in said entire image generating step.

11. The simulation method as claimed in claim 10, wherein each of said subspace simulating steps calculates voxel values for a plurality of voxels created by dividing a corresponding one of said subspaces.

12. The simulation method as claimed in claim 11, wherein each of said subspace image generating steps generates said subspace image by blending together, in accordance with a multiple sheared composition method, said voxel values simulated in a corresponding one of said subspace simulating steps.

13. The simulation method as claimed in claim 10, wherein said entire image generating step blends together said subspace images generated in said plurality of subspace image generating steps, based on priorities determined in accordance with a binary space partitioning method.

14. The simulation method as claimed in claim 13, wherein said subspace images respectively include data indicating said priorities for every frame.

15. The simulation method as claimed in claim 13, wherein said priorities are expressed in a form of a binary space-partitioning tree.

16. The simulation method as claimed in claim 13, wherein said entire image generating step comprises a plurality of composite image generating steps performed in a hierarchical manner, each of said plurality of composite image generating steps generating a composite image by blending together two subspace images according to a priority based on an occlusion relationship between said two subspace images.

17. The simulation method as claimed in claim 16, wherein each of said composite image generating step comprises:
a priority judging step for judging a priority between said two subspace images;
a switching step for switching connections between two input images and two output images based on a result of the judgement made in said priority judging step; and
an image blending step for blending together said output images output from said switching means to generate a composite image in accordance with a blending equation and outputting a composite image.

18. The simulation method as claimed in claim 17, wherein said image blending step blends first and second subspace images to generate said composite image in accordance with the following equation:

$$I_C = A_A * I_B + I_A$$

$$A_C = A_A * A_B$$

where $I_A$ is a brightness of said first subspace image, $A_A$ is a transparency of said first subspace image, $I_B$ is a brightness of said second subspace image, $A_B$ is a transparency of said second subspace image, $I_C$ is a brightness of said third subspace image and $A_C$ is a transparency of said third subspace image.

19. An image generation apparatus comprising:
a plurality of subspace image generating means for respectively generating subspace images by using independent memories;
an entire image generation means for generating an entire image by blending together said subspace images generated by said plurality of subspace image generating means;

a plurality of subspace image transmitting lines for transmitting said subspace images generated by said plurality of subspace image generating means to said entire image generation means; and a display means for displaying said entire image, wherein said entire image generation means receives said subspace images transmitted via said subspace image transmitting lines in parallel and generates said entire image from said subspace images.

20. The image generation apparatus as claimed in claim 19, wherein said subspace images are images of subspaces which are created by dividing a three-dimensional space, each of said subspace image generating means generates said subspace image by blending together, in accordance with a multiple sheared composition method, voxel values for a plurality of voxels which are created by dividing a corresponding one of said subspaces.

21. The image generation apparatus as claimed in claim 19, wherein said entire image generating means blends together said subspace images based on priorities.

22. The image generation apparatus as claimed in claim 21, wherein said subspace images respectively include data indicating said priorities for every frame.

23. The image generation apparatus as claimed in claim 21, wherein said priorities are expressed in a form of a binary space-partitioning tree.

24. The image generation apparatus as claimed in claim 21, wherein said priorities are based on occlusion relationships between said subspace images with respect to a view point.

25. The image generation apparatus as claimed in claim 24, wherein said priorities are determined according to a binary spaced-partitioning method.

26. The image generation apparatus as claimed in claim 21, wherein said entire image generating means comprises a plurality of composite image generating means arranged in a hierarchical manner, each of said plurality of composite image generating means generating a composite image by blending together two subspace images according to a priority between said two subspace images.

27. The image generation apparatus as claimed in claim 26, wherein each of said composite image generating means comprises:

a priority judging means for judging a priority between said two subspace images;

a switching means for switching connections between two input images and two output images based on a result of the judgement made by said priority judging means; and an image blending means for blending together said output images output from said switching means to generate a composite image in accordance with a blending equation and outputting said composite image.

28. The image generation apparatus as claimed in claim 27, wherein said image blending means blends first and second subspace images to generate said composite image in accordance with the following equation:

$$I_C = A_A * I_B + I_A$$

$$A_C = A_A * A_B$$

where $I_A$ is a brightness of said first subspace image, $A_A$ is a transparency of said first subspace image, $I_B$ is a brightness of said second subspace image, $A_B$ is a transparency of said second subspace image, $I_C$ is a brightness of said third subspace image and $A_C$ is a transparency of said third subspace image.

29. An image generation method comprising:

a plurality of subspace image generating steps for respectively generating and outputting subspace images in parallel;

an entire image generating step for receiving said subspace images in parallel and generating an entire image by blending together said subspace images generated in said plurality of subspace image generating steps; and a displaying step for displaying said entire image generated in said entire image generating step.

30. The image generation method as claimed in claim 29, wherein said subspace images are images of subspaces which are created by dividing a three-dimensional space each of said subspace image generating steps generates said subspace image by blending together, in accordance with a multiple sheared composition method, voxel values for a plurality of voxels which are created by dividing a corresponding one of said subspaces.

31. The image generation method as claimed in claim 29, wherein said entire image generating step blends together said subspace images based on priorities.

32. The image generation method as claimed in claim 31, wherein said subspace images respectively include data indicating said priorities for every frame.

33. The image generation method as claimed in claim 31, wherein said priorities are expressed in a form of a binary space-partitioning tree.

34. The image generation method as claimed in claim 31, wherein said priorities are based on occlusion relationships between said subspace images with respect to a view point.

35. The image generation method as claimed in claim 34, wherein said priorities are expressed in a form of a binary space-partitioning tree.

36. The image generation method as claimed in claim 29, wherein said entire image generating step comprises a plurality of composite image generating steps performed in parallel and in a hierarchical manner, each of said plurality of composite image generating steps generating a composite image by blending together two subspace images according to a priority between said two subspace images.

37. The image generating method as claimed in claim 36, wherein each of said composite image generating step comprises:

a priority judging step for judging a priority between said two subspace images;

a switching step for switching connections between two input images and two output images based on a result of the judgement made in said priority judging step; and an image blending step for blending together said output images output from said switching means to generate a composite image in accordance with a blending equation and outputting a composite image.

38. The image generation method as claimed in claim 37, wherein said image blending step blends first and second subspace images to generate said composite image in accordance with the following equation:

$$I_C = A_A * I_B + I_A$$

$$A_C = A_A * A_B$$

where $I_A$ is a brightness of said first subspace image, $A_A$ is a transparency of said first subspace image, $I_B$ is a brightness of said second subspace image, $A_B$ is a transparency of said second subspace image, $I_C$ is a brightness of said third subspace image and $A_C$ is a transparency of said third subspace image.

* * * * *